May 27, 1958     H. HILKENE     2,835,988
VISUAL AID FOR ARITHMETIC COMPUTATION
Filed Dec. 20, 1955
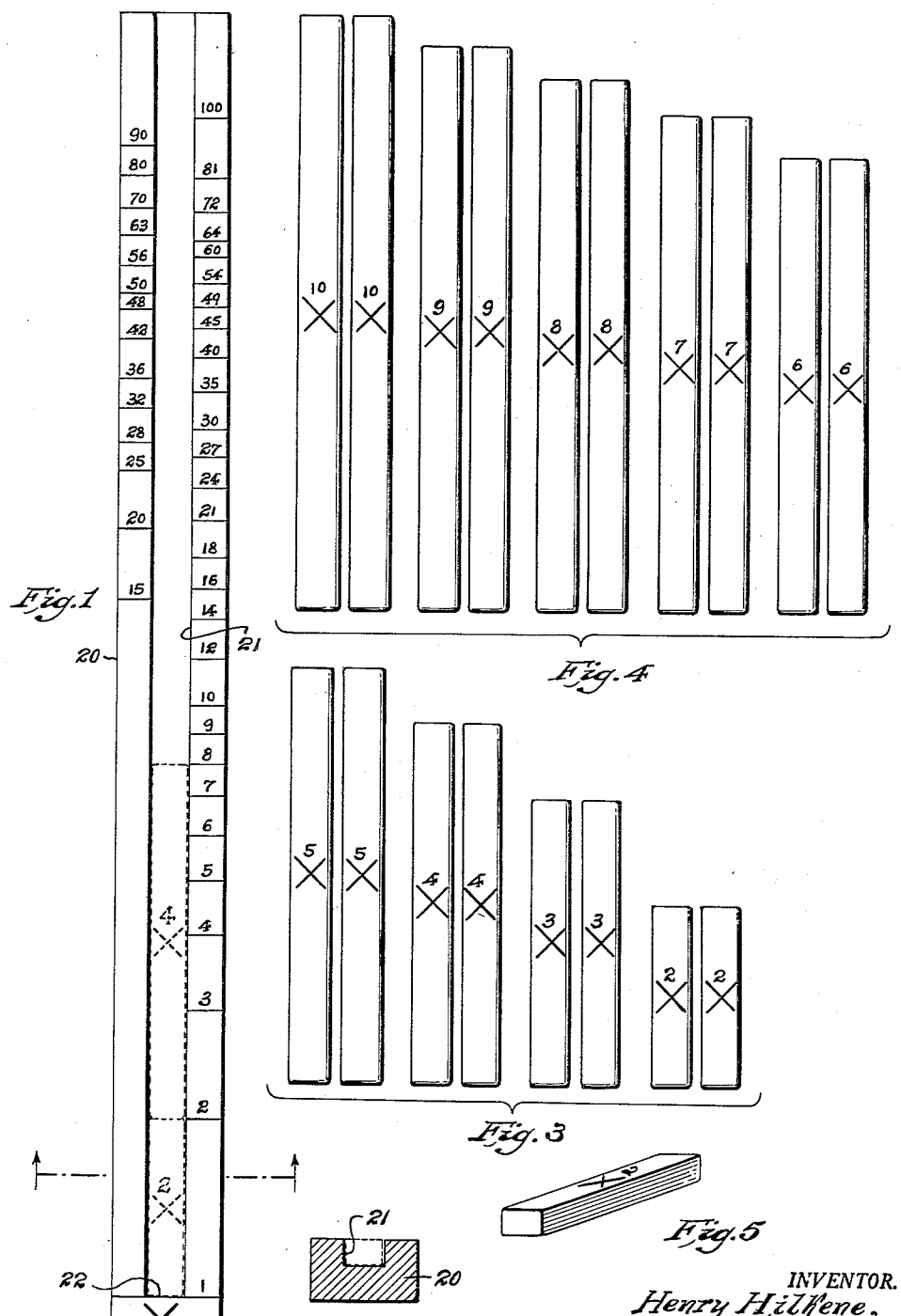
INVENTOR.
Henry Hilkene,
BY George D. Richards
Attorney

United States Patent Office 2,835,988
Patented May 27, 1958

2,835,988
VISUAL AID FOR ARITHMETIC COMPUTATION
Henry Hilkene, Belleville, N. J.
Application December 20, 1955, Serial No. 554,258
3 Claims. (Cl. 35—31)

This invention relates to an educational device for use as a visual aid in the teaching of certain arithmetical computations.

In the teaching of children, especially in the field of arithmetic or number computation, it has been found that use of visual aids is of advantage, especially to help in memorizing products of number calculations. Various devices are known by which a rudimentary arithmetic process such as addition of numbers can be visualized, but it does not appear that a simple, compact and easily manipulatable device has been available by which a more complex arithmetic process such as multiplication of one number by another can be quickly carried out and the resultant product immediately visibly indicated merely by manipulation of multiplicand and multiplier denoting pieces.

It is therefore an object of this invention to provide a simple device by which the arithmetic process of multiplication can be visually aided; said device comprising at least two sets of blocks or pieces, the blocks or pieces of each set respectively denoting different numerical values, e. g. from 2 to 10 inclusive, and being of different lengths proportional to the logarithms of the numbers denoted thereby, and a holder to which selected blocks or pieces, respectively denoting numbers desired to be multiplied one by the other, can be applied in end to end relation for reference to a product number indicating scale borne by the holder; the product number indicating graduations of said scale being relatively spaced proportionately to the logarithms of the product numbers indicated thereby, said product numbers being included within a range e. g. from 2 to 100 inclusive, 1 being a zero or base indication relative to which the applied number blocks or pieces are based in their operative end to end assembled relation with the holder.

The above stated and other objects will be understood from a reading of the following detailed description of this invention in connection with the accompanying drawings, in which:

Fig. 1 is a top plan view of a holder to which number denoting blocks or pieces can be removably applied; and
Fig. 2 is a vertical cross-sectional view, taken on line 2—2 in Fig. 1.

Figs. 3 and 4, taken together, present face views of sets of number denoting blocks or pieces, selections from which are adapted to be applied to the holder of Fig. 1.

Fig. 5 is a perspective view of one of the blocks or pieces from a set thereof.

As shown in Figs. 3 and 4, at least two sets of number denoting blocks or pieces are provided, each set thereof comprising nine blocks or pieces of like width and thickness but of various lengths, and respectively bearing numbers 2 to 10 inclusive. In use, said two sets of blocks or pieces, together totaling eighteen blocks or pieces, are all that are necessary to carry out multiplication of numbers in the range of 2×2 to 10×10 inclusive.

The respective lengths of individual blocks or pieces of each set thereof are calculated with reference to logarithms to the base ten, whereby the logarithms of the numbers borne by the respective blocks or pieces determine respective lengths thereof, in accordance with the following logarithm table laid out with reference to an inch unit of linear measurement, wherein:

1 = 0 inch
2 = 3.0103 inches
3 = 4.7712 inches
4 = 6.0206 inches
5 = 6.9897 inches
6 = 7.7815 inches
7 = 8.4510 inches
8 = 9.0309 inches
9 = 9.5424 inches
10 = 10.0000 inches From the above table, it will be obvious that the relative lengths of the blocks or pieces are not based on multiples of the unit of linear measurement, and consequently do not follow a uniform progressive pattern with respect to relative lengths thereof, but rather a pattern whereby their relative lengths vary in proportion to the logarithmic differences of the numbers borne thereby.

Although, for purposes of illustration, the above logarithm table is laid out with reference to the inch as a unit of linear measurement, it can optionally be laid out with reference to any other suitable unit of linear measurement.

The device of this invention further includes a holder to which selected blocks or pieces from the sets thereof can be applied to ascertain and visualize the product resulting from multiplication of the numbers borne by the applied blocks one by the other. An illustrative form of the holder, as shown, comprises an elongated body 20 provided with an outwardly open longitudinal channel 21, closed at its bottom end by an end wall 22. The width and depth of said channel 21 correspond respectively to the widths and thicknesses of the blocks or pieces to be applied thereto. On the marginal faces of the body 20 of the holder, which border opposite longitudinal sides of the block or piece receiving channel 21 thereof, are inscribed scales graduated to indicate various product numbers, e. g. within a range of 2 to 100 inclusive, which result from multiplication one by the other of numbers borne by blocks or pieces operatively applied to the holder. One scale is provided with a graduation marked 1 which is disposed in aligned registration with the inner face of the end wall 22 of the holder, thus providing a zero or base indication relative to which the applied blocks or pieces are footed when operatively arranged in end to end relation in the receiving channel 21 of the holder. As shown, the product number indicating scale is arranged in two sections respectively inscribed on the respective faces of the holder body 20 which border the receiving channel 21. This is a preferred but not an essential arrangement, since the scale could be arranged as a single continuous scale entirely on one side of the receiving channel 21. The two section arrangement shown is preferred however since it permits wider separation of those graduations and their associated product indicating numbers, which otherwise would be brought into close adjacency. The wider separation of such graduations makes for easier reading of the scale. The graduations of the scale are relatively spaced proportionally to the logarithmic differences of the product numbers indicated thereby.

In the use and manipulation of the device, blocks or pieces respectively bearing numbers desired to be multiplied one by the other are deposited within the receiving channel 21 of the holder 20 in end to end relation, with the lower block or piece footed upon the end wall 22 so that its bottom end is in register with the zero or base mark 1 of the product indicating scale. When the applied blocks or pieces are thus arranged the top end of upper block or piece will register with that product number indicating graduation of the scale which gives the product which would be obtained by multiplication of the numbers of the applied blocks or pieces one by the other. By way of example, assume it is desired to multiply 2×4. A block or piece bearing number 2 is footed in the receiving channel 21 of the holder 20, and then a block or piece bearing number 4 is entered in said receiving channel in end to end abutting relation to the entered block or piece bearing the number 2 (see broken line showing of such blocks or pieces in Fig. 1). By such end to end disposition of said blocks or pieces, the top end of the upper block or piece is registered in alignment with the graduation of the scale which indicates the product number 8, thus immediately visually displaying the product of multiplication 2×4. It will now be understood that the arithmetic process of multiplication of numbers within a range of 2×2 to 10×10 inclusive, by means of a minimum number of eighteen blocks or pieces, providing two sets of nine blocks each numbered from 2 to 10 inclusive, or within a lesser or greater range by reducing or increasing the number of blocks or pieces comprising the respective sets thereof can be visualized. It will also be observed, that the multiplication process and product indication is directly and immediately obtained, without necessity for selecting, independently manipulating, and comparing product indicating comparison blocks or pieces in addition to the multiplicand and multiplier blocks, or without necessity for using a plurality of multiplicand indicating blocks or pieces, the number thereof so used denoting the multiplier figure.

The device of this invention can also be used to visually demonstrate more complex problems of multiplication, such as the multiplication of the product of two members by a third member; for example, 2×4×5. The product of 2×4 having been demonstrated to be 8 in the manner above described, assume that it is desired to multiply such product by a third number, for example 5. In such case, all that is necessary to be done is to enter in the receiving channel 21 of the holder body 20 a block or piece numbered 5 in end to end relation to the respectively numbered blocks or pieces 2 and 4 previously mounted in the holder, whereupon the top end of the added block or piece 5 will register in alignment with the graduation of the holder scale which indicates the product number 40, thus immediately and visaually demonstrating the problem 2×4×5=40.

Although the device of this invention is especially well adapted to visually demonstrate the arithmetic process of multiplication of numbers, it may also be used to visually demonstrate the arithmetic process of division of one number by another. For example, assume that it is desired to divide 8 by 4, the blocks or pieces bearing the numbers 2 and 4 are entered in the receiving channel 21 of the holder body 20 (as shown by broken lines in Fig. 1), so that the 4 block or piece (the divisor) registers with the scale graduation marked 8 (the dividend). This having been done, the 4 block or piece is removed, whereupon the top end of the ramaining block or piece registers with the scale graduation marked 2, which gives the quotinent, and thus visually demonstrates the problem 8÷4=2.

With respect to the holder, although the channeled form thereof above described provides a preferable form, it will nevertheless be understood, that the holder need not be channeled, but may be a flat faced board or body having an area to receive the pieces, to which area the scale graduations are parallel. It will also be understood that the pieces do not have to be of block form, but may merely comprise flat pieces, e. g. cardboard of suitable width and of lengths determined as above described with reference to the blocks. In fact any suitable construction of holder to which the pieces can be applied end to end in such position as to cooperate with product indicating scale may be provided.

Having now described my invention, I claim:

1. A device of the kind described comprising at least two sets of pieces, the pieces of each set respectively bearing consecutive numbers beginning with 2 on the shortest piece, said pieces being of various lengths, a holder comprising an elongated body having an outwardly open longitudinally extending channel therein closed at one end by an end wall, said channel being adapted to receive selected pieces disposed in end to end relation to abut and extend from the end wall thereof, and marginal portions of the top face of the holder body bordering the piece receiving channel thereof having a graduated scale thereon, the graduations of which are respectively denoted by numbers within the range of 1 to 100 or more, with the number 1 graduation aligned with the piece engageable inner face of the end wall of said receiving channel, the lengths of respective pieces of each set thereof and the spacing of the graduations of said scale of the holder body being both determined with reference to a selected unit of linear measurement by the logarithms to the base ten of the numbers borne by said pieces and the logarithms of the numbers denoting said graduations.

2. A device of the kind described comprising at least two sets of pieces, each set thereof comprising nine pieces of progressively increased length and respectively bearing consecutive numbers 2 to 10 inclusive, each piece having a length which is determined with reference to a selected unit of linear measurement by the logarithms to the base ten of the number borne thereby, and a holder comprising an elongated body having means to receive selected pieces in end to end relation and an abutment in engagement with which the received pieces are footed, said holder body having a graduated scale bordering the receiving means thereof to which the received pieces are adapted to refer, the graduations of said scale being denoted by numbers 1 to 100, with the number 1 graduation aligned with the inner face of the abutment which is engageable by received pieces, the graduations of said scale being calibrated with reference to the same unit of linear measurement as used to determine the lengths of the pieces but in accordance with the logarithms to the base ten of the numbers denoting said graduations.

3. A device of the kind described comprising at least two sets of elongate pieces of suitable width and thickness, each set comprising nine pieces of progressively increased length and respectively bearing numbers 2 to 10 inclusive, each piece having a length which is determined with reference to a selected unit of linear measurement by the logarithms to the base ten of the number borne thereby, and a holder comprising an elongated body having an outwardly open longitudinally extending channel therein closed at one end by an end wall, said channel being adapted to receive selected pieces disposed in end to end relation to abut and extend from the end wall thereof, said channel being of width and depth corresponding to the width and thickness of the pieces, marginal portions of the top face of the holder body bordering opposite sides of the piece receiving channel thereof having complementary sections of a graduated scale, the combined graduations of which are successively denoted by numbers 1 to 100, with the number 1 graduation aligned with the piece engageable inner face of the end wall of the receiving channel, the graduations of said scale being calibrated with reference to the same unit of linear measurement as used to determine the lengths of the pieces but in accordance with the logarithms to the base ten of the numbers denoting said graduations.

References Cited in the file of this patent

UNITED STATES PATENTS

| Number | Name | Date |
| --- | --- | --- |
| 1,471,437 | Wood | Oct. 23, 1923 |
| 1,594,376 | Passmore | Aug. 3, 1926 |
| 2,317,206 | Major | Apr. 20, 1943 |
| 2,486,260 | Church | Oct. 25, 1949 |
| 2,494,469 | Booth | Jan. 10, 1950 |
| 2,514,636 | Glaze | July 11, 1950 |